(12) United States Patent
Bouwer et al.

(10) Patent No.: US 9,273,267 B2
(45) Date of Patent: Mar. 1, 2016

(54) METHOD OF TREATING AN EDIBLE OIL

(75) Inventors: Sietze Theodorus Bouwer, Wormerveer (NL); Patrick van der Waal, Wormerveer (NL)

(73) Assignee: STEPAN SPECIALTY PRODUCTS, LLC, Wilmington, DE (US)

( * ) Notice: Subject to any disclaimer, the term of this patent is extended or adjusted under 35 U.S.C. 154(b) by 52 days.

(21) Appl. No.: 13/583,275

(22) PCT Filed: Mar. 7, 2011

(86) PCT No.: PCT/EP2011/053365
§ 371 (c)(1),
(2), (4) Date: Nov. 19, 2012

(87) PCT Pub. No.: WO2011/110516
PCT Pub. Date: Sep. 15, 2011

(65) Prior Publication Data
US 2013/0102673 A1    Apr. 25, 2013

(30) Foreign Application Priority Data
Mar. 9, 2010   (EP) ................................... 10250435

(51) Int. Cl.
*C11B 3/00*  (2006.01)
*A23D 9/06*  (2006.01)
*C11B 3/06*  (2006.01)

(52) U.S. Cl.
CPC . *C11B 3/001* (2013.01); *A23D 9/06* (2013.01); *C11B 3/06* (2013.01)

(58) Field of Classification Search
CPC ............ A23D 9/06; C11B 3/001; C11B 3/06
See application file for complete search history.

(56) References Cited

U.S. PATENT DOCUMENTS

| 432,251 A | 5/1890 | Smith |
| 1,956,573 A | 5/1934 | Haslam et al. |
| 6,127,185 A | 10/2000 | Melton et al. |
| 7,179,491 B1 | 2/2007 | Mag |
| 7,741,500 B2 * | 6/2010 | Arhancet et al. .................. 554/8 |
| 2006/0099693 A1 | 5/2006 | Kobzeff et al. |
| 2006/0110521 A1 | 5/2006 | Heise et al. |
| 2006/0134178 A1 | 6/2006 | Doisaki et al. |
| 2007/0141222 A1 * | 6/2007 | Binder et al. ................. 426/601 |
| 2008/0107791 A1 | 5/2008 | Fichtali et al. |
| 2009/0099260 A1 | 4/2009 | Senanayake et al. |
| 2009/0118525 A1 * | 5/2009 | Wang ............................ 554/191 |
| 2009/0202679 A1 | 8/2009 | Mathisen |

FOREIGN PATENT DOCUMENTS

| CN | 1568725 | 1/2005 |
| EP | 0902082 | 3/1999 |
| EP | 1616486 | 1/2006 |
| GB | 952754 | 3/1964 |
| GB | 2141438 | 12/1984 |
| JP | 54016512 | 2/1979 |
| JP | 2000-342291 | 12/2000 |
| JP | 2008-069184 | 3/2008 |
| JP | 2009-153485 | 7/2009 |
| WO | WO 97/18320 | 5/1997 |
| WO | WO 2006/052662 | 5/2006 |
| WO | WO 2007/001522 | 1/2007 |
| WO | WO 2007/075632 | 7/2007 |

OTHER PUBLICATIONS

Ma et al. JAOCS, vol. 76, No. 6 (1999).*
Search Report and Written Opinion issued in Int'l App. No. PCT/EP2011/053365 (2011).
Office Action issued in Chinese app. No. CN2011813007 (2013).

* cited by examiner

*Primary Examiner* — Savitha Rao
*Assistant Examiner* — Angela Brown-Pettigrew
(74) *Attorney, Agent, or Firm* — Barnes & Thornburg LLP

(57) ABSTRACT

A method of treating an edible oil to remove aldehydes comprises contacting the oil with an amino acid and an adsorbing agent. The amino acid and the adsorbing agent are contacted with the oil separately or as a mixture.

22 Claims, No Drawings

METHOD OF TREATING AN EDIBLE OIL

CROSS REFERENCE TO RELATED APPLICATIONS

This application is a U.S. nationalization under 35 U.S.C. §371 of International Application No. PCT/EP2011/053365, filed Mar. 7, 2011, which claims priority to European Patent Application no. 10250435.4, filed Mar. 9, 2010. The disclosures set forth in the referenced applications are incorporated herein by reference in their entireties.

This invention relates to a method of treating an edible oil. In particular, the invention relates to the removal of unwanted or undesirable materials from an oil that is for oral consumption.

Edible oils that contain polyunsaturated fatty acids (PUFAs), usually in the form of glyceride esters, have been shown to have beneficial health effects. These health effects include reduction of cholesterol levels, protection against coronary heart disease and suppression of platelet aggregation. For example, fish oil, which contains the omega-3 and omega-6 fatty acids docosahexaenoic acid (DHA) and eicosapentaenoic acid (EPA), has been used in food products and in nutritional products for its health benefits. Fish oils are described in documents such as US2006/0134178 and US 2009/0202679.

DHA is also available as a microbial oil, as described in US 2009/0099260 and US 2008/0107791, for example.

Conjugated linoleic acid (CLA) is another example of a PUFA and is a conjugated dienoic fatty acid having 18 carbon atoms. As a result of the presence of the two double bonds in CLA, geometrical isomerism is possible and the CLA molecule or moiety may exist in a number of isomeric forms. The cis9, trans11 ("c9t11") and trans10, cis12 ("t10c12") isomers of CLA are generally the most abundant and beneficial pharmacological effects have been identified for each of these isomers.

One problem with PUFAs is that they have a tendency to undergo oxidation and as a result can have an unpleasant taste and/or odour. The taste and/or odour can be due to the formation of aldehydes. The aldehydes are sometimes categorised as being "volatile" or "non-volatile". Volatile aldehydes can be removed by standard processes such as deodorisation. However, non-volatile aldehydes have relatively high boiling points and are much more difficult to remove. It is these non-volatile aldehydes that can cause persistent problems in an oil, which are usually reflected in a relatively high anisidine value. The anisidine value (AV) of an oil is a standard measurement that is used for assessing the content of secondary oxidation products, such as aldehydes.

US 2006/0110521 relates to oil compositions having a high concentration of PUFAs. The document describes how the AV of the oil can be reduced by contacting the oil with an amine on a support, such as an amino-functionalised resin.

WO 2007/075632 discloses the treatment of oil with an active substance capable of reducing the AV of the oil. The active substance, in one example, can be an amino acid such as lysine. The active material may be used as such, for example as a liquid, or it may be bound to, embedded in, or dispersed on a solid support. The processes that are described involve pretreating the support with the active material prior to contact with the oil.

Surprisingly, we have now found a process for removing aldehydes from edible oils which is more efficient and/or more effective than the known processes described above. It has been found that using an unsupported amino acid separately from an adsorbing agent has unexpected advantages.

According to the present invention, there is provided a method of treating an edible oil to remove aldehydes, which comprises contacting the oil with an amino acid and an adsorbing agent, wherein the amino acid and the adsorbing agent are contacted with the oil separately or as a mixture.

In another aspect, the invention provides the use of an amino acid and an adsorbing agent, separately or as a mixture, to remove contaminating aldehydes from an edible oil.

Also provided by the invention in another aspect is an edible oil comprising one or more glycerides, having from 37 to 60% of EPA and DHA by weight of the fatty acid residues present in the glycerides, a ratio of EPA to DHA of greater than 1 and a Totox value of less than 15.

A further aspect of the invention is an edible oil comprising conjugated linoleic acid (CLA) in the form of one or more glycerides, having a conjugated linoleic acid content of at least 50% by weight of the fatty acid residues present in the glycerides and a Totox value of less than 2.

In the invention, the oil is contacted with an amino acid and an adsorbing agent. Together these two materials act to reduce the level of aldehydes in the oil and hence its anisidine value (AV). Without wishing to be bound by theory, it is believed that the amino acid reacts with the aldehydes to form a compound that is subsequently removed by the adsorbing agent.

The amino acid and the adsorbing agent are contacted with the oil separately or as a mixture. By this it is meant that the amino acid and the adsorbing agent are either contacted with the oil in separate stages (for example by addition of one to the oil followed by the addition of the other) or in one stage as a mixture (for example by adding a mixture of amino acid and adsorbing agent to the oil). The term mixture is used in its normal sense of a combination of discrete particles or phases of each different material that are physically separable, for example without the need to fracture the particles or phases. Thus, the amino acid and the adsorbing agent are not pretreated with each other such that they are physically or chemically attached. For example, the adsorbing agent is not pretreated with the amino acid such that the amino acid is supported or coated on the adsorbing agent. The mixture is preferably a powder comprising discrete particles of amino acid and discrete particles of adsorbing agent or a suspension of solid adsorbing agent in a liquid phase comprising the amino acid (such as in the form of an aqueous solution).

The invention has the advantages that it may be possible to use a smaller amount of amino acid and/or adsorbing agent compared to the processes of the prior art. Additionally or alternatively, a given amount of amino acid and/or adsorbing agent may provide a higher degree of removal of aldehydes, as determined by AV. Also, the invention has the advantage that no pretreatment or coating step is required, thus simplifying the overall process.

Preferably, the oil is for oral consumption. Typically, the oil will be for consumption by a human.

The oil may be any oil that is edible and contains contaminating aldehydes.

The oil preferably contains glycerides and will generally contain di- and tri-glycerides as the major components, typically in a combined amount of at least 50% by weight of the oil, such as at least 75%, at least 85% or at least 95% by weight of the oil. The oil may comprise monoglycerides and free carboxylic acids, typically in a total amount of less than 5% by weight of the oil.

The glycerides are preferably predominantly glycerides that contain fatty acid residues. The term "fatty acids" as used herein includes saturated and unsaturated, straight chain carboxylic acids having from 12 to 24 carbon atoms and, optionally, one, two, three or more unsaturated carbon-carbon double bonds. Typically, fatty acids will constitute at least 75% by weight of the carboxylic acids present in the glycerides, more preferably at least 90% by weight.

Preferably, the oil contains glycerides of polyunsaturated fatty acids, typically in an amount of at least 10% by weight based on the weight of total fatty acid residues present, more preferably at least 20%, such as at least 30% or at least 40% by weight.

Preferably, the oil comprises EPA and DHA in a combined amount of at least 5% by weight based on the weight of total fatty acid residues present, more preferably at least 15%, such as at least 25% or at least 35% by weight. The ratio of EPA:DHA is preferably greater than 1.

Preferably, the oil is a natural oil e.g., an oil that is an animal oil or a vegetable oil. Most preferably, the oil is a marine oil, even more preferably fish oil. Fish oil is a particularly preferred oil for the invention.

An alternative (or additional) oil comprises one or more glycerides of conjugated linoleic acid (CLA). The CLA may comprise one isomer or a mixture of two or more different isomers including: cis, cis; cis, trans; trans, cis; and trans, trans isomers. Preferred isomers are the trans10, cis12 and cis9, trans 11 isomers (also referred to herein as t10c12 and c9t11, respectively), including these isomers in relatively pure form, as well as mixtures with each other and/or mixtures with other isomers. More preferably, the conjugated linoleic acid may comprise trans10, cis12 and cis9, trans11 isomers and the weight ratio of trans10, cis12 isomer to cis9, trans11 isomer or vice versa may be at least 1.2:1, such as 1.3:1, even more preferably at least 1.5:1, e.g., in the range 1.5:1 to 100:1 or 1.5:1 to 10:1, such as a 60:40 or 80:20 mixture of the trans10, cis12: cis9, trans11 isomers. The trans10, cis 12 isomer and/or the cis9, trans 11 isomer may be the major isomer component i.e., present in an amount of at least 55%, preferably at least 60%, more preferably at least 70%, even more preferably at least 75%, most preferably at least 80%, such as at least 90% or even 100% by weight based on the total amount of conjugated linoleic acid. For example, the CLA may comprise c9t11 and t10c12 isomers and the weight ratio of the c9t11 to t10c12 isomers may be from 99:1 to 1 to 99, preferably from 90:10 to 10:90 most preferably from 80:20 to 20:80. CLA can be produced in conventional ways. For example, CLA can be produced by known methods, such as that described in EP-A-902082, the contents of which are incorporated herein by reference. CLA products that are enriched in one or more isomers are disclosed in WO 97/18320, the contents of which are also incorporated herein by reference.

The oil also contains aldehydes. These will typically be present at low levels, typically less than 2% or less than 1% by weight of the oil. The aldehydes are typically aldehydes having C12 to C24 alkyl or alkenyl groups (wherein the alkenyl groups can have one or more carbon-carbon double bonds).

In the process of the invention, the anisidine value (AV) of the oil is lowered compared to the untreated oil. Preferably, the AV is lowered by at least 50% compared to the AV of the oil prior to the treatment. Anisidine value can be determined according to AOCS, Cd 18-90, p-Anisidine Value, 1997.

The process of the invention may also lower the peroxide value (PV). The PV may be determined according to AOCS; Cd 8b-90; Peroxide value; 1997.

The amino acid that is used in the present invention may be a single amino acid or a mixture of two or more amino acids. Preferably, the amino acid is used in an amount of from 0.05 to 1.0% by weight, based on the weight of the oil. It has been found that these levels of amino acid give effective removal of the aldehydes as determined by a lowering of the AV.

Preferred amino acids are the naturally occurring amino acids. The amino acids will typically be used at food grade purity. The more preferred amino acids are lysine, cysteine, arginine or mixtures thereof, with lysine being the most preferred amino acid. Amino acids are preferably in the form of free amino acids but may alternatively be in the form of peptides having free amino groups (e.g., protein hydrolysates). Mixtures of free amino acids and peptides may also be used.

The amino acid may be used in the invention in the form of a solid, such as a powder, or a liquid, such as an aqueous solution, slurry or emulsion.

The adsorbing agent that is used in the present invention may be a single adsorbing agent or a mixture of two or more adsorbing agents. The adsorbing agent is preferably used in an amount of from 1 to 5% by weight, based on the weight of the oil.

Suitable adsorbing agents include silica, bleaching earths, clays, or a mixture of two or more of these. Preferably, the adsorbing agent is silica.

The method of the invention involves contacting the oil with the amino acid and the adsorbing agent. Preferably, the amino acid and the adsorbing agent are added to the oil. More preferably, the amino acid and the adsorbing agent are separately added to the oil. For example, the amino acid may be added to the oil first, followed by the addition of the adsorbing agent.

In an alternative method of the invention, the amino acid and the adsorbing agent are mixed and the resulting mixture is added to the oil.

In the method of the invention, the amino acid and the adsorbing agent are preferably added to the oil at a temperature in the range of from 20 to 90° C., more preferably from 50 to 80° C.

The method of the invention preferably comprises the steps of:
(a) adding an amino acid to an oil; and
(b) adding an adsorbing agent to the mixture of amino acid and oil formed in (a).

Preferably, after (a), the mixture of amino acid and oil is left for from 1 to 60 minutes (more preferably from 5 to 40 minutes) prior to (b), optionally with stirring.

Typically, the mixture that is formed after (b) is left for from 1 to 60 minutes (more preferably from 5 to 40 minutes).

After step (b), the mixture is preferably dried and filtered. Drying is preferably carried out at reduced pressure, more preferably less than 250 mbar, most preferably at a substantially constant temperature such as in the range of 50 to 80° C. Filtering is preferably carried out using a filter having a pore size of less than 5 μm.

Additionally or alternatively to drying after step (b), the mixture may be dried after step (a). Drying is preferably carried out at reduced pressure, more preferably less than 250 mbar, most preferably at a substantially constant temperature such as in the range of 50 to 80° C.

Thus, a most preferred method of the invention comprises:
(a) adding an amino acid to an oil (preferably at a temperature in the range of from 50 to 80° C.);
(b) adding an adsorbing agent to the mixture of amino acid and oil formed in (a); and
(c) drying and filtering the mixture formed in (b).

Another preferred method of the invention comprises:
(a) adding an amino acid to a fish oil or to a glyceride comprising CLA (i.e., bound in the glyceride), wherein the amino acid is used in an amount of from 0.05 to 1.0% by weight, based on the weight of the oil;

(b) adding an adsorbing agent to the mixture of amino acid and oil formed in (a); and (c) drying the mixture formed in (b).

The method of the invention may form part of an overall process for the purification of fish oil, which comprises:
providing crude fish oil;
neutralizing the crude fish oil to remove at least some of the free fatty acids present;
treating the oil with a bleaching earth; and
deodorizing the bleached oil,
wherein the method of the invention is carried out before or after the step of treating the oil with the bleaching earth.

Techniques for neutralizing fish oil, treating fish oil with a bleaching earth and deodorizing fish oil are well-known to those skilled in the art.

The invention surprisingly allows the formation of oils that have a low Totox value. Totox value is well known in the art as being a way of defining the total oxidation of an oil and is defined as Totox=(2×PV)+AV.

Thus, the edible oil may comprise conjugated linoleic acid (CLA) in the form of one or more glycerides (i.e., mono-, di- and/or tri-glycerides), having a conjugated linoleic acid (CLA) content (i.e., CLA bound in the glycerides) of at least 50% by weight of the fatty acid residues present in the glycerides and a Totox value of less than 2. Preferably, the content of CLA is at least 70%, more preferably at least 75%, based on the weight of the fatty acid residues present in the glycerides. Preferably, the Totox value is less than 1.8 or less than 1.6 or less than 1.4 or less than 1.2 or less than 1.1. For example, the oil may have a CLA content of at least 75% and a Totox of less than 1.2 or less than 1.1.

In another aspect, the edible oil is an edible oil comprising one or more glycerides (i.e., mono-, di- and/or tri-glycerides), having from 37 to 60% (preferably more than 38% up to 60%) of EPA and DHA by weight of the fatty acid residues present in the glycerides, a ratio of EPA to DHA of greater than 1 (preferably greater than 1.1) and a Totox value of less than 15. Typically, the composition will be a fish oil. Surprisingly, it has been found to be possible to obtain a Totox value of less than 14, such as less than 13 or less than 12 e.g., less than 11. For example, the edible oil may comprise one or more glycerides (i.e., mono-, di- and/or tri-glycerides), having greater than 38% up to 60% of total EPA and DHA by weight of the fatty acid residues present in the glycerides, a ratio of EPA to DHA of greater than 1.1 and a Totox value of less than 15.

The edible oils produced in the process of the invention may be used in a food product, a food supplement or pharmaceutical product. Therefore, the invention also contemplates a food product, food supplement or pharmaceutical product comprising an edible oil of the invention. Food supplements or pharmaceutical products may be in the form of capsules or other forms, suitable for enteral or parenteral application.

Food supplements (which term includes nutritional supplements) are particularly preferred. Examples of food supplements include products in the form of a soft gel or a hard capsule preferably comprising an encapsulating material selected from the group consisting of gelatin, starch, modified starch, starch derivatives such as glucose, sucrose, lactose and fructose. The encapsulating material may optionally contain cross-linking or polymerizing agents, stabilizers, antioxidants, light absorbing agents for protecting light-sensitive fills, preservatives and the like. Preferably, the unit dosage of conjugated fatty acid in the food supplements is from 1 mg to 1000 mg (more preferably from 100 mg to 750 mg).

Food products optionally comprise the edible oil as a blend with a complementary fat. The blend may comprise 0.3-95 wt %, preferably 2-80 wt %, most preferably 5-40 wt % of the edible oil of the invention and 99.7-5 wt %, preferably 98-20 wt %, most preferably 95-60 wt % of a complementary fat preferably selected from: cocoa butter, cocoa butter equivalents, palm oil or fractions thereof, palm kernel oil or fractions thereof, interesterified mixtures of said fats or fractions thereof, or liquid oils, selected from: sunflower oil, high oleic sunflower oil, soybean oil, rapeseed oil, cottonseed oil, fish oil, safflower oil, high oleic safflower oil, maize oil and MCT-oils.

The food products (which term includes animal feed), may contain a fat phase, wherein the fat phase contains an edible oil of the invention. Examples of suitable food products include those selected from the group consisting of margarines, fat continuous or water continuous or bicontinuous spreads, fat reduced spreads, confectionery products such as chocolate or chocolate coatings or chocolate fillings or bakery fillings, ice creams, ice cream coatings, ice cream inclusions, dressings, mayonnaises, cheeses, creams, cream alternatives, dry soups, sauces, drinks, cereal bars, sauces, snack bars, dairy products, bakery products, clinical nutrition products and infant food or infant formulations.

Pharmaceutical products include pharmaceutical compositions, such as in the form of tablets, pills, capsules, caplets, multiparticulates including: granules, beads, pellets and micro-encapsulated particles; powders, elixirs, syrups, suspensions and solutions. Pharmaceutical compositions will comprise a pharmaceutically acceptable diluent or carrier. Pharmaceutical compositions are preferably adapted for administration parenterally (e.g., orally). Orally administrable compositions may be in solid or liquid form and may take the form of tablets, powders, suspensions and syrups. Optionally, the compositions comprise one or more flavouring and/or colouring agents. Pharmaceutically acceptable carriers suitable for use in such compositions are well known in the art of pharmacy. The compositions are generally prepared in unit dosage form. Preferably the unit dosage is from 1 mg to 1000 mg (more preferably from 100 mg to 750 mg). The excipients used in the preparation of these compositions can include excipients known in the art.

The invention will now be described with reference to the following non-limiting examples. In the examples and throughout this specification, all percentages, parts and ratios are by weight unless indicated otherwise.

EXAMPLES

In the examples, anisidine value (AV) is determined according to AOCS, Cd 18-90, p-Anisidine Value, 1997. Peroxide value (PV) is determined according to AOCS; Cd 8b-90; Peroxide value; 1997

Example 1

Treatment of Oil by Separate Addition of Silica and Lysine

In this example, the effect of separate addition of lysine broth (feed grade and containing 50% L-Lysine) (from Ajinomoto) and Trysil silica (from Grace) on the AV reduction of unrefined fish oil having an AV of 22.6 was investigated.

100 g oil was heated to 70° C. and mixed with lysine broth. After 20 minutes, Trisyl was added and also mixed. After an additional 20 minutes, the mixture was dried for 30 minutes under reduced pressure (about 100 mbar). At the end a sample was taken and filtered through a 1 pm Millipore filter. The sample was analyzed for AV and PV. The results are given in Table 1.

TABLE 1

| | | AV | | | |
|---|---|---|---|---|---|
| Lysine* (%) | Trysil (%) | Initial Anisidine value | Final Anisidine value | Δ Anisidine Value | Final PV Peroxide value |
| 0.1 | 1.4 | 22.6 | 7.3 | 15.3 | 1.7 |
| 0.2 | 2.8 | 22.6 | 4.7 | 17.9 | 5.1 |

*added as broth, amount calculated based on pure lysine

Example 2 (Comparative)

Preparation of Silica Precoated with Lysine

In this experiment, lysine broth was coated on silica. 14.25 g lysine broth was added to 110 ml demineralised water. To this solution, 100 g Trysil was added and stirred at 40° C. The water was removed after 15 minutes at 70° C. and reduced pressure.

The Trysil used contains about 50% water. After complete drying, the precoated lysine broth on silica contains 13% lysine.

Example 3 (Comparative)

Treatment of Oil Using Silica Precoated with Lysine

Precoated lysine (produced according to Example 2) was used for AV reduction of the unrefined fish oil having an AV of 22.6.

100 g oil was heated to 70° C. and then mixed for 30 minutes with precoated lysine. After 30 minutes, a sample was taken and filtered through a 1 μm Millipore filter. The sample was analyzed for AV and PV. The results are given in Table 2.

TABLE 2

| Lysine (%)* | Initial Anisidine Value | Final Anisidine Value | Δ Anisidine Value | Final Peroxide Value |
|---|---|---|---|---|
| 0.1 | 22.6 | 15.9 | 6.7 | 4.3 |
| 0.2 | 22.6 | 9.9 | 12.7 | 2.6 |

*added as broth, amount calculated based on pure lysine

Example 4 (Comparative)

Treatment of Oil with Lysine

In this experiment liquid lysine broth was used to reduce the AV of unrefined fish oil.

100 g of oil was heated to 70° C. and mixed with 0.4 g lysine broth. After 30 minutes a sample was taken and the oil phase was separated by centrifuge (4500 rpm for 5 minutes). The oil phase was filtered through a 1 μm Millipore filter. The sample was analyzed for AV and PV. The results are given in Table 3.

The oil that came out of this experiment was much darker than the comparable experiment with Trysil silica (Example 1).

TABLE 3

| Lysine (%)* | Final Anisidine Value | Δ Anisidine Value | Final Peroxide Value |
|---|---|---|---|
| 0.2 | 11.9 | 10.7 | 4.7 |

*added as broth, amount calculated based on pure lysine

Example 5

Treatment of Refined Fish Oil 2 kg refined fish oil (neutralized, bleached and deodorized) was heated to 70° C. under $N_2$. The oil was then treated according to a or b below:
  a. 0.2% Lysine broth (Ajinomoto) was added and mixed at 100 rpm. This delivers 0.1% lysine. After 20 minutes the mixture was dried for 10 minutes under reduced pressure (100 mbar). Then 1.4% Trysil and 0.5% Hiflow filter aid was added and also mixed for 20 minutes at 100 rpm. The mixture was again dried for 30 minutes under reduced pressure (100 mbar). Finally, the mixture was filtered.
  b. No treatment.

After the treatments, the temperature was raised to 80° C. and the samples were bleached with 1% Tonsil 215FF bleaching earth and 0.5% Hiflow filter aid for 30 minutes at atmospheric pressure and for 15 minutes at 100 mbar (100 rpm). After bleaching, the samples were filtered and deodorized for 2 hours at 195° C. The samples were analyzed for AV. The results are given in Table 4.

TABLE 4

| | Starting refined fish oil | Fish oil after treatment | |
|---|---|---|---|
| | | a: lysine broth + Trysil | b: none |
| AV | 9.1 | 4.6 | 6.7 |

Example 6

Taste Testing of Treated Oil

A trained taste panel was used to taste the products produced in Example 5 in milk.

4 gram of oil was mixed in 196 gram skimmed milk at 50° C. and stirred using an Ultraturrax for about 2 minutes. After 2 minutes the mixture was homogenized with a two stage homogenizer (Niro Soavi, type NS1001L2K) at 200/50 bar.

40 gram of this emulsion was mixed with 160 gram skimmed milk (10-15° C.) about 30 minutes before tasting. The trained panel evaluated the milk samples with the emulsions on a JAR-scale (Just About Right scale) on several attributes. The scale runs from 0-100; 50 indicates that the tested sample is just about right, thus equal to a reference sample (skimmed milk); 100 indicates too much of an attribute; 0 indicates too little of an attribute.

The results are given in Table 5.

TABLE 5

| | Fish smell | Fish taste | After taste |
|---|---|---|---|
| Untreated | 73 | 86 | 59 |
| Lysine broth + Trysil | 58 | 61 | 53 |

Example 7

Treatment of Conjugated Linoleic Acid (CLA)

2 kg unrefined CLA (Clarinol G80, Lipid Nutrition, Wormerveer, NL) was heated to 70° C. under $N_2$. The oil was then treated according to a or b below:
- a. 0.4% Lysine broth (Ajinomoto) was added and mixed at 100 rpm. This delivers 0.2% lysine. After 20 minutes the mixture was dried for 10 minutes under reduced pressure (100 mbar). Then 2.8% Trysil (56 g) and 0.5% Hiflow filter aid (10 g) was added and also mixed for 20 minutes at 100 rpm. The mixture was again dried for 30 minutes under reduced pressure (100 mbar). Finally the mixture was filtered.
- b. No treatment.

After the treatments, the temperature was raised to 80° C. and an antioxidant mixture (0.4%) was added. Then the samples were bleached with 1% Tonsil 215FF bleaching earth, 0.5% Trysil and 0.5% Hiflow filter aid for 15 minutes at atmospheric pressure and for 15 minutes at 100 mbar (100 rpm). After bleaching, the samples were filtered and deodorized for 2.5 hours at 135° C. The samples were analyzed for AV and PV. The results are given in Table 6.

TABLE 6

|  | AV | PV (meqO$_2$/kg) |
| --- | --- | --- |
| Before treatment | 12.0 | 1.1 |
| Without extra treatment | 15.3 | 0.2 |
| Lysine broth + Trysil | 0.6 | 0.2 |

Example 8

Taste Testing of Treated CLA

A trained taste panel was used to taste the products produced in Example 7.

For this the oil was heated to about 50° C. and tasted by the panel. The trained panel evaluated the samples on a JAR-scale (Just About Right scale) on several attributes. The scale runs from 0-100; 50 indicates that the tested sample is just about right, thus equal to a reference sample (oil without smell and taste); 100 indicates too much of an attribute; 0 indicates too little of an attribute. The results are given in Table 7.

TABLE 7

|  | Rancid smell | Rancid taste |
| --- | --- | --- |
| Untreated | 54 | 61 |
| Lysine broth + Trysil | 50 | 50 |

Example 9 (Comparative)

Effect of Silica Alone on AV

Experiments on unrefined fish oil showed that Trysil lowers the AV of the oil by about 1.2 AV units per 1% of silica added by weight of the oil. Therefore, the effect on AV of silica used alone is minimal.

The invention claimed is:

1. A method of removing aldehydes from an oil comprising contacting the oil with an amino acid and an adsorbing agent, wherein the amino acid and the adsorbing agent are contacted with the oil in separate stages, wherein the amino acid is an unsupported amino acid and 0.05% to 1% by weight of the oil and wherein the adsorbing agent is used in an amount of from 1 to 5% by weight, based on the weight of the oil.

2. The method of claim 1, wherein the oil is for oral consumption.

3. The method of claim 2, wherein the oil is fish oil.

4. The method of claim 2, wherein the oil comprises one or more glycerides of conjugated linoleic acid.

5. The method of claim 1, wherein an anisidine value (AV) of the oil is lowered compared to untreated oil.

6. The method of claim 1, wherein the amino acid is used in an amount of from 0.05 to 0.5% by weight, based on the weight of the oil.

7. The method of claim 1, wherein the amino acid is lysine, cysteine, arginine or a mixture thereof.

8. The method of claim 1, wherein the adsorbing agent is silica, a bleaching earth, a clay, or a mixture thereof.

9. The method of claim 1, wherein the amino acid and the adsorbing agent are added to the oil.

10. The method of claim 9, wherein the amino acid and the adsorbing agent are added to the oil at a temperature in the range of from 50 to 80° C.

11. The method of claim 1, wherein the anisidine value (AV) of the oil is lowered by at least 50% compared to the AV of the oil prior to treatment.

12. The method of claim 7, wherein the amino acid is lysine.

13. The method of claim 8, wherein the adsorbing agent is silica.

14. A method of removing aldehydes from an oil comprising contacting the oil with an amino acid and an adsorbing agent mixture, wherein the amino acid and the adsorbing agent are physically separable from the mixture wherein the amino acid is an unsupported amino acid and is 0.05% to 1% by weight of the oil and wherein the adsorbing agent is used in an amount of from 1 to 5% by weight, based on the weight of the oil.

15. The method of claim 14, wherein the mixture is a powder comprising discrete particles of amino acid and discrete particles of adsorbing agent.

16. The method of claim 14, wherein the amino acid is lysine, cysteine, arginine or a mixture thereof.

17. The method of claim 16, wherein the amino acid is lysine.

18. The method of claim 14, wherein the adsorbing agent is silica, a bleaching earth, a clay, or a mixture thereof.

19. The method of claim 18, wherein the adsorbing agent is silica.

20. The method of claim 14, wherein the mixture is a liquid.

21. The method of claim 20, wherein the liquid is an aqueous solution, slurry, or emulsion.

22. The method of claim 14, wherein an anisidine value (AV) of the oil is lowered compared to untreated oil.

* * * * *